(12) United States Patent
Lefort

(10) Patent No.: US 11,173,679 B2
(45) Date of Patent: Nov. 16, 2021

(54) METHOD OF WORKING FOR PROCESSING SCRAP METAL ON A SCRAP-METAL RECYCLING SITE, AND SHEARING PRESS OR PRESS OR SHEARS EMPLOYED IN THIS METHOD

(71) Applicant: PRESSES ET CISAILLES LEFORT, SOCIÉTÉ ANONYME, Gosselies (BE)

(72) Inventor: Christian Yvon N. Lefort, Ittre (BE)

(73) Assignee: PRESSES ET CISAILLES LEFORT, SOCIÉTÉ ANONYME, Gosselies (BE)

( * ) Notice: Subject to any disclaimer, the term of this patent is extended or adjusted under 35 U.S.C. 154(b) by 419 days.

(21) Appl. No.: 16/069,823

(22) PCT Filed: Jan. 9, 2017

(86) PCT No.: PCT/BE2017/000008
§ 371 (c)(1),
(2) Date: Jul. 12, 2018

(87) PCT Pub. No.: WO2017/124157
PCT Pub. Date: Jul. 27, 2017

(65) Prior Publication Data
US 2019/0022966 A1 Jan. 24, 2019

(30) Foreign Application Priority Data
Jan. 22, 2016 (BE) .................................. 2016/5052

(51) Int. Cl.
*B30B 9/32* (2006.01)
*B30B 15/30* (2006.01)

(52) U.S. Cl.
CPC ................ *B30B 9/326* (2013.01); *B30B 9/32* (2013.01); *B30B 15/30* (2013.01); *Y10S 100/901* (2013.01)

(58) Field of Classification Search
CPC ......... B30B 9/32; B30B 9/326; B30B 9/3007; B30B 9/3046; B30B 9/3042; B30B 15/30; (Continued)

(56) References Cited

U.S. PATENT DOCUMENTS 2,816,502 A * 12/1957 Eismann ................... B30B 9/32
100/100
3,196,726 A 7/1965 Mordan
(Continued)

FOREIGN PATENT DOCUMENTS

DE 2351573 A1 * 4/1975 ............... B30B 9/32
JP S56-89400 A 7/1981
(Continued)

OTHER PUBLICATIONS

International Search Report, dated Apr. 25, 2017, from corresponding PCT application No. PCT/BE2017/000008.

*Primary Examiner* — Jimmy T Nguyen
(74) *Attorney, Agent, or Firm* — Nixon & Vanderhye

(57) ABSTRACT

Method of working for processing scrap metal stored on a scrap-metal collecting site using a shearing press, press or shears for the processing of scrap metal, the shearing press, press or shears being provided with a filling tray and with an outlet for the processed scrap metal. The device is a self-powered shearing press, press or shears, namely a shearing press, press or shears provided with its own mechanism for movement.

24 Claims, 5 Drawing Sheets

(58) Field of Classification Search
CPC ..... Y10S 100/901; B23D 15/02; B23D 15/14; B23D 17/06; E02F 3/26
See application file for complete search history.

(56) References Cited

U.S. PATENT DOCUMENTS

| | | | | |
|---|---|---|---|---|
| 3,404,622 | A * | 10/1968 | Flanagan | B30B 9/32 100/100 |
| 3,554,119 | A | 1/1971 | Schoelthorn et al. | |
| 3,730,078 | A * | 5/1973 | Flanagan | B30B 9/32 100/48 |
| 3,765,323 | A * | 10/1973 | Hix | B30B 9/32 100/100 |
| 3,859,910 | A | 1/1975 | Swanson | |
| 4,337,694 | A * | 7/1982 | Brown | B30B 9/3007 100/215 |
| 4,625,636 | A * | 12/1986 | Woods | B30B 9/32 100/215 |
| 4,685,391 | A | 8/1987 | Picker | |
| 4,697,509 | A * | 10/1987 | LaBounty | E02F 3/404 100/233 |
| 6,382,425 | B1 * | 5/2002 | Brickner | B07B 1/005 209/12.1 |
| 7,942,355 | B2 | 5/2011 | Yamazaki | |
| 2004/0031403 | A1 * | 2/2004 | Johnson | B30B 9/32 100/100 |
| 2009/0084173 | A1 * | 4/2009 | Gudat | G01S 17/88 73/146 |
| 2017/0100905 | A1 * | 4/2017 | Wente | B30B 9/326 |

FOREIGN PATENT DOCUMENTS

| | | | | |
|---|---|---|---|---|
| JP | 01197099 | | 8/1989 | |
| JP | H01-197099 A | | 8/1989 | |
| JP | H02-81795 | | 6/1990 | |
| JP | H02-81796 | | 6/1990 | |
| JP | H02-155598 A | | 6/1990 | |
| JP | 2711341 B2 * | | 2/1998 | B30B 9/32 |
| KR | 101064107 | | 9/2011 | |
| KR | 101 144 823 B1 | | 5/2012 | |
| KR | 101144823 | | 5/2012 | |

* cited by examiner

STATE OF THE ART

STATE OF THE ART

STATE OF THE ART

METHOD OF WORKING FOR PROCESSING SCRAP METAL ON A SCRAP-METAL RECYCLING SITE, AND SHEARING PRESS OR PRESS OR SHEARS EMPLOYED IN THIS METHOD

BACKGROUND OF THE INVENTION

Field of the Invention

The invention involves a method for processing scrap metal in a scrap recycling yard and a shear press or a press or shear used for this method.

Hereunder the term shear press shall refer to scrap presses, scrap shears, and shear presses as such.

A scrap shear press is designed to cut and/or compact large quantities of scrap metal, such as collected scrap metal, demolition scrap metal or similar products which are stored in a scrap recycling yard in areas designated for such purpose.

The cut and compacted scrap metal is temporarily collected in an area of the yard close to the shear press, separate from the areas where the scrap metal is processed.

A shear press generally comprises a loading container for receiving a quantity of scrap metal to be processed and an outlet in the shape of a vertical guillotine gantry with cutting blades to cut the scrap metal that is taken from the container with the help of a hydraulic tappet, which is then retracted to reload the empty container with a new quantity of scrap metal to be processed.

The scrap metal is thus consecutively processed container by container. The shear press cycle takes some time to complete the job. At the end of the cycle, the machine stops and waits for a new load.

Description of the Related Art

Scrap yards are generally equipped with a stationary shear press which is generally supplied by a mobile loading device, for example by a crane with a grab, an electromagnet or other equipment to fetch the scrap metal to be processed and to place it in the container.

The crane has to move several times to fill the shear press container sufficiently.

During the shear press cycle, the crane needs to move back and forth over increasingly longer distances to go fetch the scrap metal to be processed which is stored in the yard.

After each shear press cycle, the crane is used to recover the processed scrap metal as it emerges from the shear press and take it to the storage area, which requires additional movements.

Given that there are significant volumes of material to be processed, the crane moves often and over increasingly long distances as the stock of scrap metal is further and further away from the stationary shear press, which leads to time loss, a significant consumption of diesel, noise due to the crane moving, dangers generated by the movements, crane wear, etc.

A stationary shear press has thus some disadvantages due to its immobility, such as:
  the scrap metal to be processed must be brought to the machine;
  the processed scrap metal must be cleared and moved after processing so as not to obstruct the consecutive output of a new quantity of scrap metal processed by the shear press;
  It is not possible to adapt to the geographical evolution of the scrap yard;
  the shear press must wait for the scrap metal to be processed to arrive once the stock of scrap metal to be processed is too far away.

There are also towed shear presses, but these shear presses are generally used as stationary shear presses as the special convoy of such towed shear press is difficult, due to its size and weight, and it has the disadvantage of not being very maneuverable and it requires large spaces for maneuvering and a traction unit.

In reality, towed shear presses can be moved from yard to yard but not easily within a yard.

Such towed shear presses have the same disadvantages as shear presses, but additionally they also have the following disadvantages:
  obligation to use a tractor unit for a semi-trailer;
  the tractor unit has to be detached while the shear press is running for obvious reasons of protection from falling scrap metal moved by the crane;
  it takes several minutes to reinflate the tractor unit's pneumatic circuits before the convoy can make any movement;
  the stabilization legs of the shear press must be folded up before the convoy, consisting of the tractor unit and the shear press, can make any movement;
  the ground must be cleared of any scrap metal that may have fallen when loading the shear press so as to avoid deteriorating the pneumatic circuits, brake systems, suspensions and electric cabling before the convoy makes any movement;
  the main engine of the shear press must be stopped for safety reasons before the convoy makes any movements.

Every time the towed shear press is moved, one is faced with the same disadvantages as all reverse operations and maneuvers must be done in the new position of the shear press.

JP H01 197099, JP S56 9400, JP H02 81796, JP H02 81795 and U.S. Pat. No. 4,697,509 describe shear presses (or presses) mounted on a crane. The KR 101 144823 system is also mounted on a crane or truck. However, these systems are not of the same dimensions and weights as the shear presses of the invention.

JP H02155598, U.S. Pat. Nos. 2,816,502 and 3,730,078 describe shear presses mounted on a truck.

BRIEF SUMMARY OF THE INVENTION

The objective of the invention is to avoid one or more of the above-mentioned disadvantages and to provide a more effective method for processing scrap metal on a scrap recycling yard by using a self-propelled shear press.

According to the invention, this objective is attained by a method for processing scrap metal stored at a scrap recycling yard by using a shear press with a loading container and an outlet for the processed scrap metal and by using a loading device to fill the shear press container with the scrap metal to be processed, wherein the method uses a self-propelled shear press, namely a shear press with its own means of moving, and with autonomous mobility enabling the operations and movements of the shear press (1), press or shear to be remotely controlled by an operator and the method comprises the following steps:
  providing for a storage area for the scrap metal to be processed;
  proceeding cyclically with:

moving the shear press into the storage area or along the storage area within reach of the loading device;

filling the shear press container with scrap metal to be processed using the loading device;

operating the shear press to process the scrap metal loaded into the shear press container;

moving the shear press to process a next heap of scrap metal to be processed, leaving the processed scrap metal that has been cleared from the shear press where it is.

The advantage of the invention lies in the possibility of a more rational use of a conventional shear press by providing it with autonomous mobility enabling the operator of the loading device, who loads the shear press with scrap metal to be processed, to move about a scrap metal yard without having to make multiple, ever longer, journeys and to even eliminate such journeys.

The loading device is preferably a mobile device so that the two machines, namely the shear press and the loading device, are able to move simultaneously to avoid the machines always being close to one another, also with the aim of minimalizing the number of journeys.

The self-propelled shear press is equipped with a remote control which is preferably used by the loading device operator to control the movements and operations of the shear press.

The operator is thus able to work alone in the most rational way by reducing, or even eliminating, crane movements.

The shear press preferably has only one engine used for operating both the shear press and its movements. We thereby avoid the expense of a second engine for traction and the need to provide additional space for such engine.

The scrap yard can be organized in such a way that the path followed by the shear press and the loading device together is mainly a straight or curved path, which requires the least movements and maneuvers and thus saves time.

The path followed by the shear press should preferably be travelled with the shear press outlet for clearing the processed scrap metal pointing towards the back, namely in the opposite direction of the path travelled.

The processed scrap metal is left where it is, without impeding the movements of the shear press and leaving the processed scrap metal along a straight or curved path facilitates pick up of the processed scrap metal for transport.

The invention also involves a shear press for the application of the method according to the invention, being a self-propelled shear press, namely a shear press able to move on its own and with autonomous mobility enabling the operations and movements of the shear press (1), press or shear to be remotely controlled by an operator.

The advantages of a shear press according to the invention, compared to a stationary shear press or a towed shear press, in combination with a loading device, can be summed up as follows:

the self-propelled shear press evolves at the same time as the crane that provides it with scrap metal to be processed;

the long back and forth loading movements are drastically reduced, or even eliminated, as the self-propelled shear press follows the movements of the loading device;

due to the reduction in movements of the loading device there is:
  less wear;
  less noise;
  fewer risks of accidents;
  less pollution;
  fuel saving;

the self-propelled shear press saves time because:
  the shear press does not have to wait for loading by the loading device;
  there is no need to remove the processed material exiting the self-propelled shear press, as the self-propelled shear press can advance after the end of each cycle;
  the self-propelled shear press can be put to work as soon as it arrives on site;

the time saved by the shear press results in:
  less pollution by the shear press;
  fuel saving for the shear press;
  better overall output;

a significant percentage increase of the storage volume of scrap metal to be processed at the yard as the maneuvering area of the loading device and of the self-propelled shear press is reduced.

The shear press is preferably equipped with traction tracks to move, which makes the self-propelled shear press very maneuverable as it is able to rotate 360° in its position, resulting in reduced maneuvering space and thus in increased scrap metal storage volume.

Moreover, a shear press on tracks is able to move on uneven sites.

The overall length of the self-propelled shear press is also drastically reduced compared to a stationary shear press or a towed shear press.

The shear press is preferably of such size as to be transportable by road on a machine-bearing trailer.

Many of these advantages also apply to a stationary loading device such as a rotating crane superstructure mounted on a stationary pillar.

BRIEF DESCRIPTION OF THE DRAWINGS

For greater clarity, an example of a shear press as per the invention is described hereunder solely for the purpose of illustration and without restrictive nature, reference being made to the annexed drawings in which.

DETAILED DESCRIPTION OF THE PREFERRED EMBODIMENTS

Figure 1:
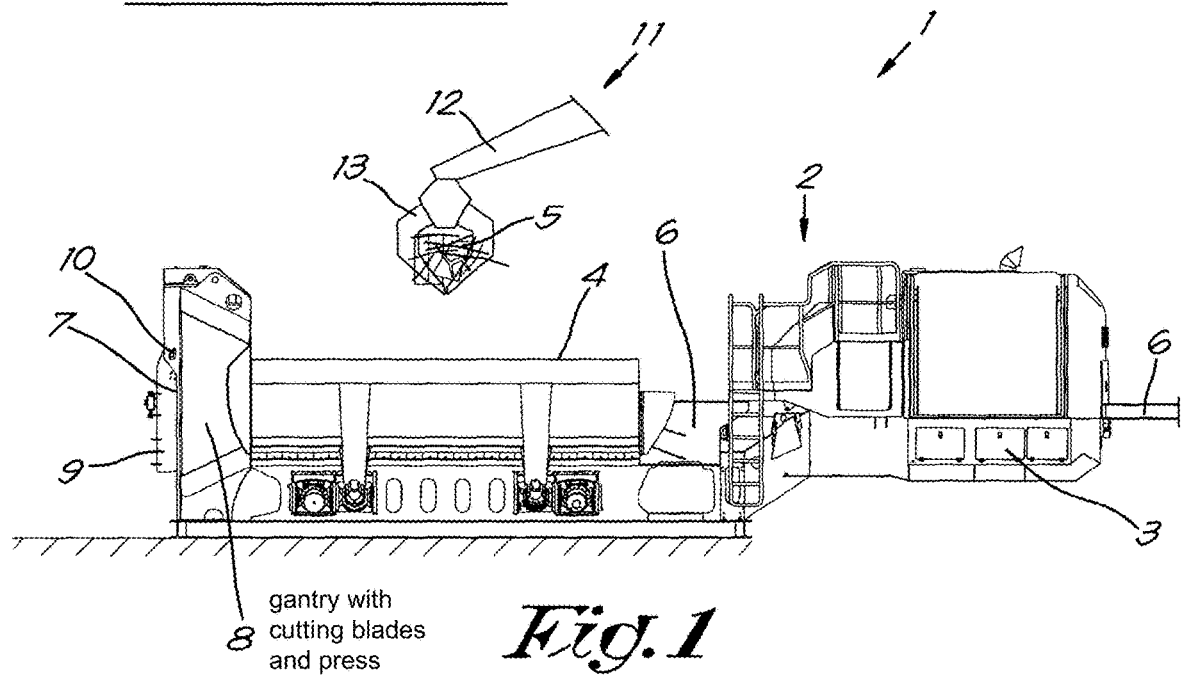
FIG. 1 is a schematic lateral view of a state-of-the-art scrap metal shear in a normal running situation.
Figure 2:
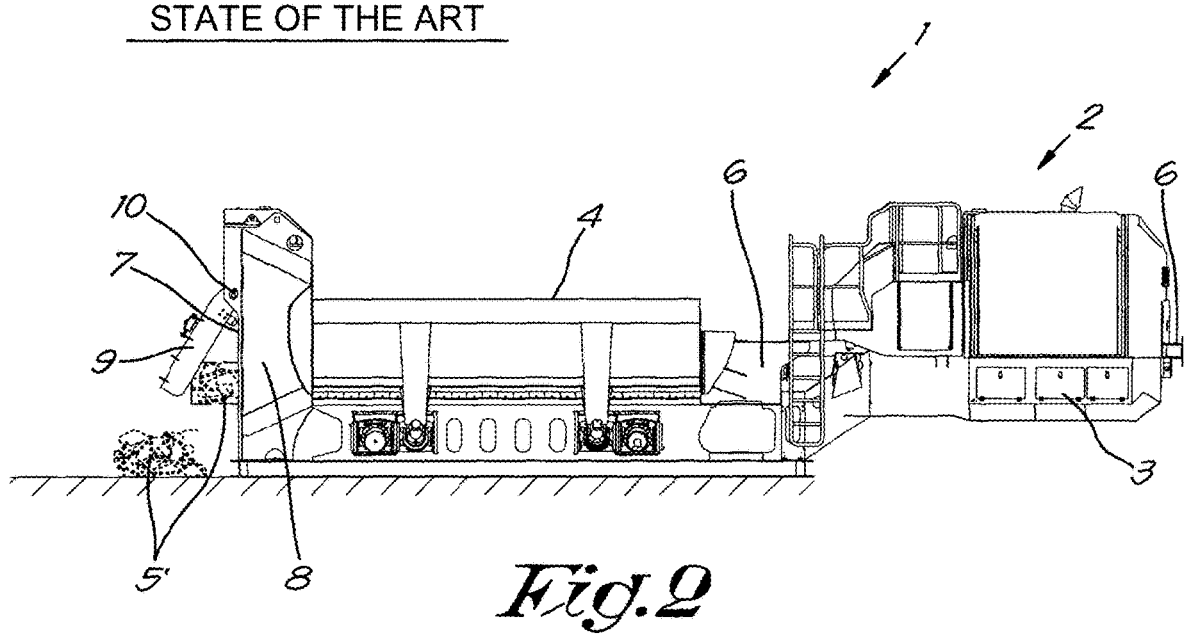
FIG. 2 shows the shear of FIG. 1 in a running state with output of the processed scrap metal.

The stationary shear press 1 represented in FIG. 1 has a control cabin 2; a hydraulic unit 3; a container 4 to receive the scrap to be cut 5; a horizontal tappet 6 to clear the scrap 5 from the container 4 via an outlet 7 formed by a gantry 8 which, as usual, has cutting blades and/or a non-represented press to cut and compress the scrap metal 5 before it being removed from the container via the outlet 7 which is covered by a protective hatch 9 able to freely rotate around its axis 10.

The shear press container 1 is filled by a crane-like mobile device 11 of which only the arm 12 is shown on FIG. 1 with a grab 13 at its extremity to pick up the scrap metal to be processed 5 and to set it down in the container 4, as illustrated in FIG. 1.

The shear press 1 is a conventional stationary shear press, namely immobile, which is placed in a fixed location in the yard 14.

The yard 14 is accessible by an access 15 to supply the scrap metal to be processed 5, which is also used as an exit to remove the processed scrap metal 5'.

Figure 3:
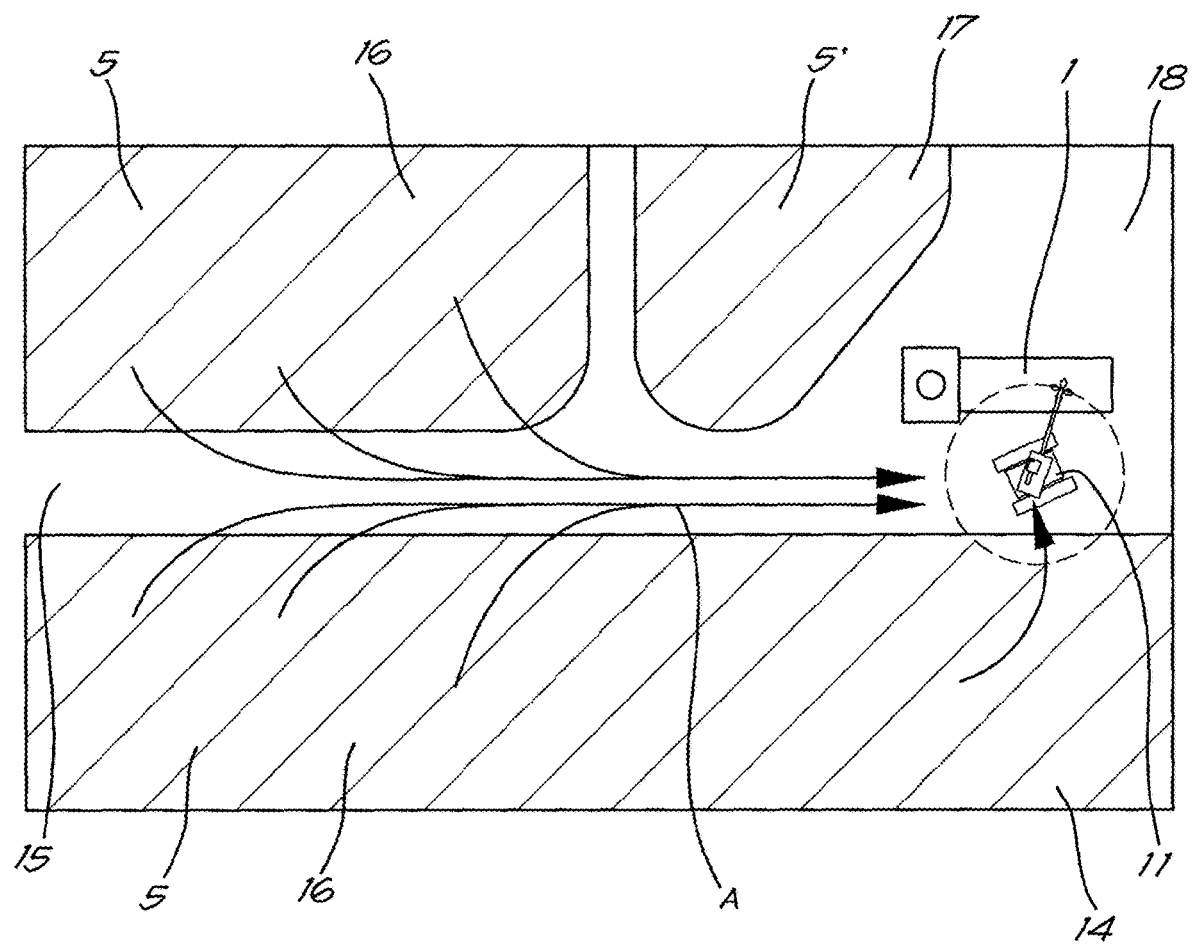
FIG. 3 shows the layout of a traditional scrap recycling yard with a stationary shear press as shown in FIG. 1.

The yard 14 is organized in a conventional manner as represented by FIG. 3 with storage area 16 for the scrap metal to be processed 5 and storage area 17 for the scrap metal 5' processed by the shear press 1.

Between areas 16 and 17 there are pathways and maneuvering area 18 in which the loading device 11 can maneuver to go pick up the scrap metal 5 from area 16 to put it in the container 4 and to fetch the processed scrap metal 5' at the outlet 7 of the shear press to place it in area 17 to provide access to trucks and trailers.

The paths taken by the loading device 11 are indicated by arrows A, which illustrate that these paths A get longer and longer as the scrap metal 5 is processed.

Figure 4:
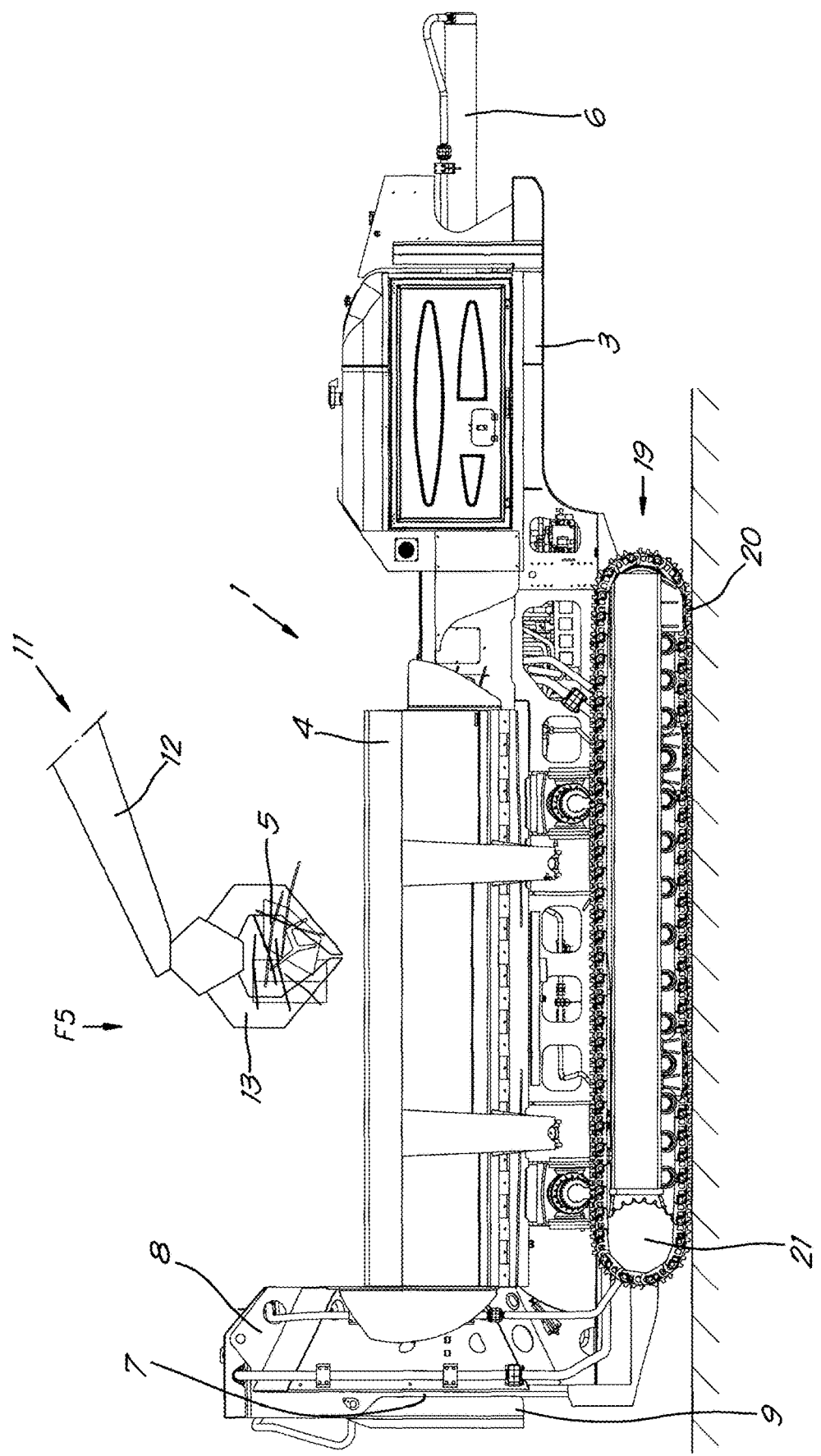
FIG. 4 is a lateral view, as in FIG. 1, but for a self-propelled shear press according to the invention.

FIG. 4 shows the example of a shear press 1 according to the invention, which, in the case presented, is a self-propelled shear press 1 equipped with means of moving and traction 19 in the form of a crawler track with two tracking units 20, each tracking unit 20 being set in motion by its own hydraulic engine 21, thus allowing the shear press to operate on the spot.

The shear press 1 according to the invention is analogous to the stationary shear press 1 of FIG. 1 equipped with a loading container 4, a tappet 6, a gantry 8 with cutting blades and press and with an outlet 7 closed by a pivotable protective hatch 9.

The shear press 1 is equipped with a hydraulic unit 3, preferably with a single heat or electric engine, to power the cylinders and hydraulic engines of the tappet 6, the blades and the press, as well as the hydraulic engines 21 of the crawler track 20 and possibly other hydraulic functions.

Figure 5:
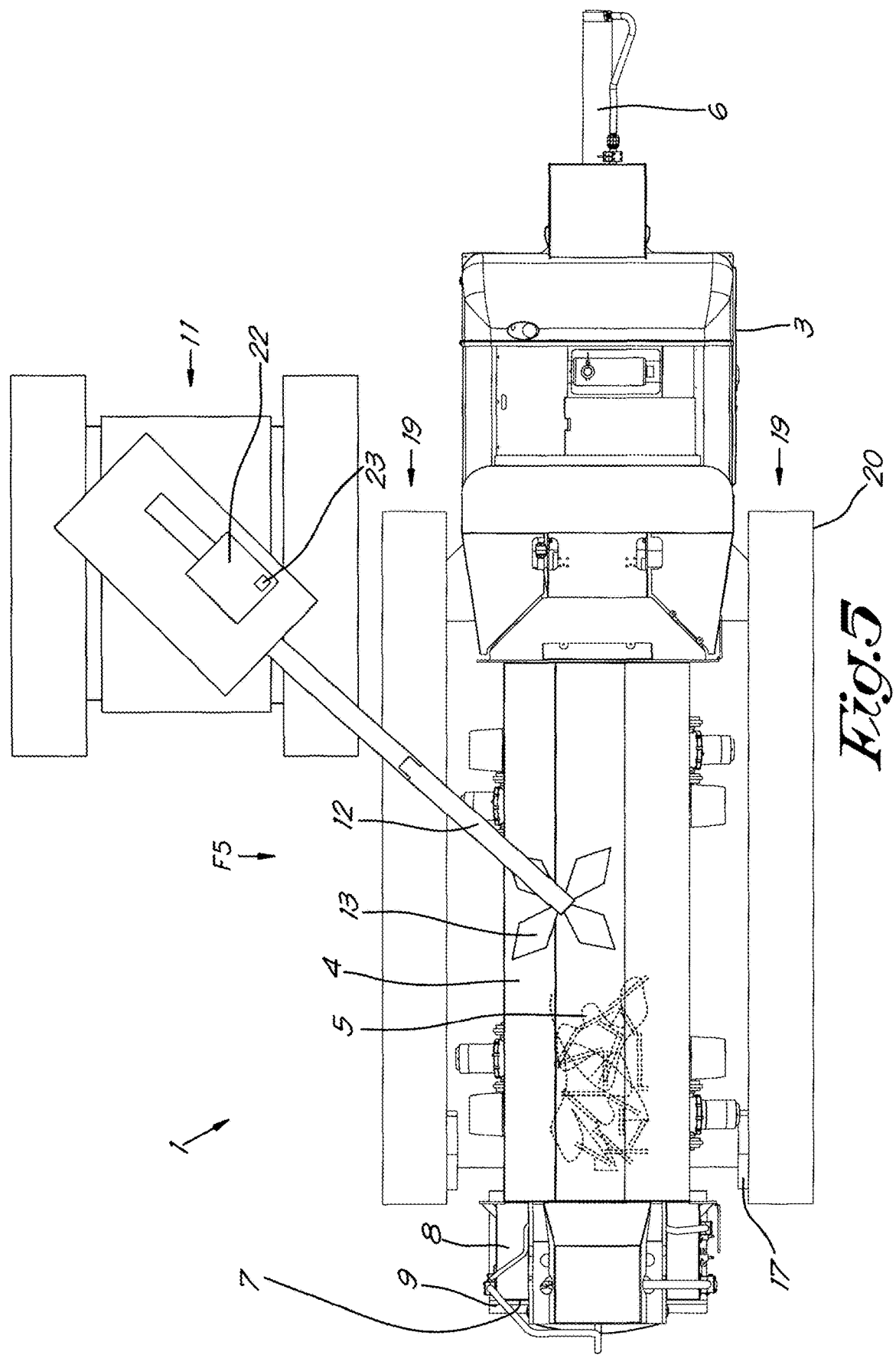
FIG. 5 is a view from the top following arrow F5 in FIG. 4.

The shear press can be loaded by the loading device 11 as illustrated in FIG. 5, for example by a crawler crane as loading device 11, preferably equipped with a raised cabin 22 for the device operator 11, to have a good view of the shear press loading operation.

The shear press has a remote control 23 for the press, shearing and traction functions, the control being mounted in the cabin 22 of the loading device 11 or the operator can take it into his or her cabin 22 to control the shear press operations 1 without having to leave his or her cabin 22 and to move the two machines 1 and 11 so they stay close to one another during loading.

Figure 6:
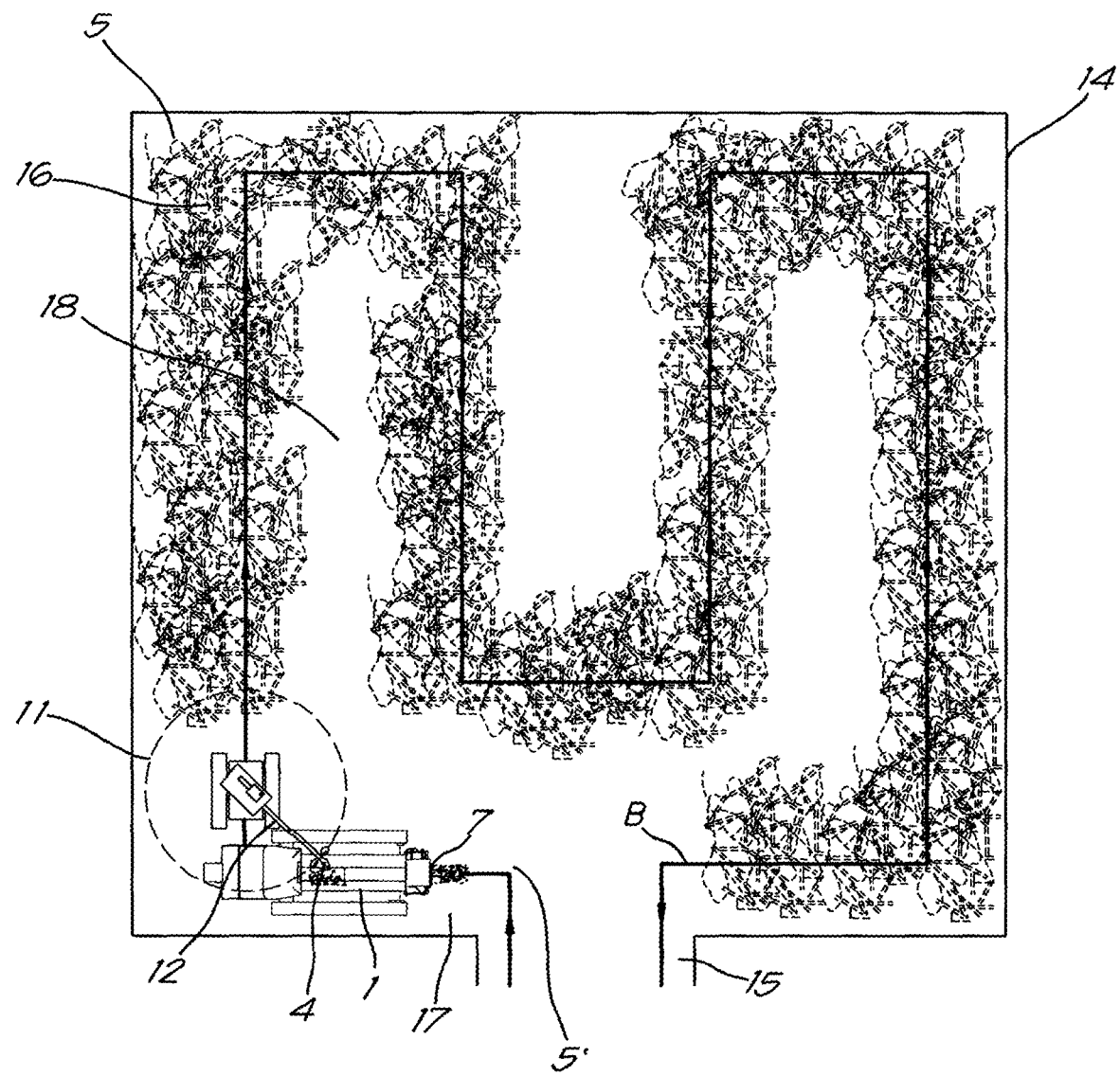
FIG. 6 is an illustration of the layout of a scrap yard using the method according to the invention with a self-propelled shear press according to FIGS. 4 and 5.

In the case of the invention, the yard 14 is organized as represented in FIG. 6, which shows that the scrap metal to be processed 5 is heaped in area 16 along a curved path indicated by B and followed by the shear press 1 and the loading device during cyclical scrap metal processing.

First, the shear press 1 is positioned at the beginning of the curved area 16 with the loading device nearby picking up the scrap metal to be processed 5 and filling the container 4 of the shear press 1.

The shear press 1 is then operated to start a processing cycle to cut and compress the content of container 4 which, at the end of the shear press cycle 1, is expelled from the outlet at the rear of the shear press 1.

Then, the shear press 1 and the device 11 are moved along area 16 for a new fill and a new shear press cycle 1 of cutting and compacting the scrap metal.

As the processed scrap metal is released at the back of the shear press and as the latter moves forward, the ejected scrap metal doesn't hinder the movements of the shear press 1 and the loading device 11.

The processed scrap metal 5' which has cleared from the shear press 1 stays along path B which is now clear of scrap metal, enabling easy access for loading trucks.

Path B is preferably a loop with its starting and ending points close to access 15.

While the two machines 1 and 11 follow the path, towards the end of path B, a new quantity of scrap metal to be processed can be deposited along the cleared area 16 so that, when the machines get to the end of loop B, they can process the new quantity of scrap metal without having to wait.

Obviously, the means of moving of the shear press 1 doesn't necessarily have to be by way of tracks but, for example, a self-propelled shear press 1 with tires is also suitable for the invention.

On some yards, the loading device is a stationary machine, for example in the shape of a turret crane mounted on a pillar and able to pick up scrap metal all around as the turret is able to turn 360° on the pillar.

A self-propelled shear press according to the invention has the advantage of limiting the movements of the turret and of the crane's equipment to an area where the scrap metal is stored around the pillar, allowing for dwindling stock elsewhere, where the shear press just passed, to be replenished.

Obviously, the invention is by no means limited to the examples described above but numerous modifications can be made to the above-described shear without going outside the scope of the invention as defined in the following claims.

The invention claimed is:

1. A method for processing scrap metal stored (5) in a scrap recycling yard (14), the method comprising:
    with a shear press (1) comprising a container (4), an outlet (7) formed as a vertical guillotine gantry (8) and having cutting blades and a press, a hydraulic tappet (6), and a hydraulic unit (3) that powers hydraulic engines of the hydraulic tappet (6), the cutting blades, and the press of the vertical guillotine gantry (8):
        receiving a quantity of scrap metal (5) to be processed into the container (4),
        using the hydraulic tappet (6) to move the scrap metal (5) from the container (4) into the outlet (7) and with the cutting blades cutting the scrap metal (5) that is taken from the container (4) with help of the hydraulic tappet (6),
    wherein a loading device (11) fills the container (4) of the shear press (1) with the scrap metal to be processed (5),
    wherein the scrap metal (5) is consecutively processed container (4) by container (4),
    wherein the shear press (1) further comprises a means of moving (19) so that the shear press (1) is a self-propelled shear press (1) with its own means of moving (19) and with autonomous mobility enabling operations and movements of the shear press (1) to be remotely controlled by an operator, the method comprising the following steps:
        providing for a storage area (16) for the scrap metal to be processed (5);
        proceeding cyclically with:

using the means of moving (19), moving the shear press (1) into the storage area or along the storage area (16) within reach of the loading device (11);

filling the container (4) of the shear press (1) with the scrap metal to be processed (5) using the loading device (11);

operating the shear press (1) to process the scrap metal (5) loaded into the container (4) and to clear the processed scrap metal (5') via the outlet (7); and using the means of moving (19), moving the shear press (1) to process a next heap of scrap metal to be processed (5), leaving the processed scrap metal where the processed scrap metal exits out the vertical guillotine gantry (8) of the container (4).

2. The method according to claim 1, wherein, the outlet (7) is at a rear of the shear press (1), the scrap recycling yard (14) is organized so that the scrap metal to be processed (5) is heaped along an indicated path (B), the shear press (1) and the loading device (11) following the indicated path (B) during cyclical scrap metal processing, whereby:

a. the shear press (1) is positioned at a beginning of the storage area (16) with the loading device (11) nearby picking up the scrap metal to be processed and filling the container (4) of the shear press (1);

b. the shear press (1) is then operated to start a processing cycle to cut and compress contents of the container (4) which, at the end of the processing cycle, is expelled from the outlet (7) at the rear of the shear press (1); and c. the shear press (1) and the loading device (11) are moved along the storage area (16) and the indicated path (B) for a new fill and a new shear press cycle (1) of cutting and compacting the scrap metal.

3. The method according to claim 1, wherein a remote control (23), from a location separate from the shear press (1), is used by the loading device operator (11) to move the shear press (1) after each processing cycle so as to start loading the shear press (1) with a new quantity of scrap metal (5) to be processed in a new processing cycle of the shear press (1).

4. The method according to claim 3, wherein the remote control is used by the loading device operator to start and stop operation of the shear press (1), press or shear.

5. The method according to claim 1, wherein the means of moving comprises crawler tracks (20) or wheels on which the shear press (1) rests on the ground.

6. The method according to claim 1, wherein the shear press (1) comprises a single engine used to operate the shear press (1) and to operate the means of moving (19).

7. The method according to claim 2, wherein the indicated path (B) followed by the shear press (1), press or shear is mainly a straight or curved path.

8. The method according to claim 7, wherein the path (B) of the shear press (1), press or shear is travelled with the outlet of the shear press (1), press or shear facing backwards, namely facing in the opposite direction of a direction travelled along the indicated path (B).

9. The method according to claim 1, wherein the loading device (11) is a mobile device.

10. The method according to claim 1, wherein the scrap recycling yard (14) is organized in such a way that the storage area (16) of the scrap metal to be processed is set out along a straight or curved path.

11. The method according to claim 10, wherein the storage area (16) is set out along a path with a starting point close to a scrap yard entrance and an arrival point close to a scrap yard exit (14).

12. The method according to claim 11, wherein the entrance and the exit of the scrap yard (14) are close to one another or coincide.

13. The method according to claim 2, wherein the means of moving comprises crawler tracks (20) or wheels on which the shear press (1) rests on the ground.

14. The method according to claim 3, wherein the means of moving comprises crawler tracks (20) or wheels on which the shear press (1) rests on the ground.

15. The method according to claim 2, wherein while the shear press (1) and loading device (11) follow the indicated path (B), towards an end of indicated path (B), a new quantity of scrap metal to be processed is deposited along a cleared area within the storage area (16) so that, when the shear press (1) and loading device (11) get to the end of indicated path (B), the shear press (1) and loading device (11) can process the new quantity of scrap metal without any waiting.

16. The method according to claim 1, wherein the loading device is separated from and located at a distance from the shear press (1), and wherein the shear press (1) and the loading device (11) are moved simultaneously to avoid the shear press (1) and the mobile device (11) from always being close to one another.

17. The method according to claim 1, wherein the loading device (11) is a stationary machine mounted on a pillar and operated to pick up the scrap metal all around as the loading device is turnable 360° on the pillar.

18. A shear press comprising:

a container (4) configured for receiving a quantity of scrap metal (5) to be processed;

an outlet (7) formed as a vertical guillotine gantry and having cutting blades and a press;

a hydraulic tappet (6), the hydraulic tappet (6) configured to move the scrap metal (5) from the container (4) into the outlet (7), wherein the cutting blades are configured for cutting the scrap metal (5) that is taken from the container (4) into the outlet (7) by the hydraulic tappet (6);

a hydraulic unit (3) that powers hydraulic engines of the hydraulic tapper (6), the cutting blades, and the press of the vertical guillotine gantry (8), wherein a loading device (11) fills the container (4) of the shear press (1) with the scrap metal to be processed (5), the loading device being separated from and located at a distance from the shear press (1);

means of moving (19) the shear press (1) so that the shear press (1) is a self-propelled shear press (1); and a remote control (23) that allows one loading device operator, using the remote control in a location separate from the shear press (1), to enable operations and movements of the shear press (1), wherein the remote control (23) is configured to allow the one loading device operator to operate the shear press within a storage area (16) for the scrap metal to be processed (5):

by using the means of moving (19), moving the shear press (1) into the storage area or along the storage area (16) within reach of the loading device (11), and operating the shear press (1) to process the scrap metal (5) loaded into the container (4) and to clear the processed scrap metal (5') via the outlet (7).

19. The shear press according to claim 18, wherein the means of moving (19) comprises traction tracks (20) or wheels with which the shear press (1) rests on the ground.

20. The shear press according to claim 18, further comprising a single engine used both to control the shear press (1) and the means of moving (19).

21. The shear press according to claim 18, being of such size as to be transportable by road on a machine-bearing trailer.

22. The shear press according to claim 18 in combination with the loading device, the loading device (11) is a mobile device being separated from and located at a distance from the shear press (1).

23. The shear press according to claim 18 in combination with the loading device 22, wherein the remote control (23) is in a cabin (22) of the loading device (11).

24. The shear press according to claim 18, wherein the outlet (7) is at the rear of the shear press (1).

\* \* \* \* \*